US012731394B2

(12) United States Patent
Lin

(10) Patent No.: US 12,731,394 B2
(45) Date of Patent: Sep. 8, 2026

(54) COMPREHENSION METHOD OF NEURAL NETWORK FOR UNRECOGNIZABLE OBJECTS

(71) Applicant: FENG CHIA UNIVERSITY, Taichung City (TW)

(72) Inventor: Wei-Lun Lin, Taichung City (TW)

(73) Assignee: FENG CHIA UNIVERSITY, Taichung City (TW)

( * ) Notice: Subject to any disclaimer, the term of this patent is extended or adjusted under 35 U.S.C. 154(b) by 203 days.

(21) Appl. No.: 18/827,670

(22) Filed: Sep. 6, 2024

(65) Prior Publication Data

US 2026/0004571 A1 Jan. 1, 2026

(30) Foreign Application Priority Data

Jul. 1, 2024 (TW) ................................ 113124470

(51) Int. Cl.
*G06K 9/62* (2022.01)
*G06V 10/26* (2022.01)
*G06V 10/82* (2022.01)

(52) U.S. Cl.
CPC .............. *G06V 10/82* (2022.01); *G06V 10/26* (2022.01)

(58) Field of Classification Search
CPC ............................... G06V 10/82; G06V 10/26
See application file for complete search history.

(56) References Cited

U.S. PATENT DOCUMENTS

2019/0187720 A1* 6/2019 Fowe ................. G01C 21/3676
2022/0180616 A1* 6/2022 Schomerus ............... B60R 1/22
2023/0386221 A1* 11/2023 Chien .................... G06V 20/58

FOREIGN PATENT DOCUMENTS

CA 3220258 A1 * 12/2022 ........... G06N 3/0442
CN 114140747 A * 3/2022 ........... G06F 18/214
TW 202115645 A 4/2021

* cited by examiner

*Primary Examiner* — Xin Jia
(74) *Attorney, Agent, or Firm* — Hershkovitz & Associates, PLLC; Abe Hershkovitz

(57) ABSTRACT

A comprehension method of neural network for unrecognizable objects comprises: determining at least one type of at least one object in an under-test information by an object recognition model to output a quantity value of recognizable objects, generating a total quantity value of objects by segmenting the at least one object in the under-test information, and comparing whether the quantity value of the recognizable objects is equal to the total quantity value of the objects. When the quantity value of recognizable objects is less than the total quantity value of objects, it means the under-test information contains unknown objects that are not recognized by the object recognition model. The processing unit trains the object recognition model that at least one unrecognizable object is included in the under-test information. The present invention provides a neural network mechanism for comprehending unknown objects similar to humans.

5 Claims, 4 Drawing Sheets

COMPREHENSION METHOD OF NEURAL NETWORK FOR UNRECOGNIZABLE OBJECTS

CROSS REFERENCE TO RELATED APPLICATIONS

The present application claims priority to Taiwan Application No. 113124470, filed on Jul. 1, 2024, the content of which is hereby incorporated by reference in its entirety.

BACKGROUND OF THE INVENTION

1. Field of the Invention

The present invention relates to neural network technology, especially a comprehension method of neural network for unrecognizable objects.

2. Description of the Related Art

A detecting method for an object in an under-test information of a conventional neural network is described as follows. The object in the under-test information is inputted into a trained object recognition model. The object recognition model compares the object in the under-test information with a large amount of data stored therein to confirm whether the object in the under-test information is a recognizable object.

A training process of the object recognition model requires a large amount of data to be manually labeled and input into the object recognition model as training data. After training, the object recognition model will perform the prediction function. Developers can modify the object recognition model according to prediction results of the object recognition model to improve a predicting accuracy of the object recognition model. For example, the developers adjust parameters of labeling process according to IOU (Intersection over Union) values, wherein the IOU values are computed based on predicted bounding boxes and ground truth bounding boxes.

However, the conventional object recognition model has problems in object recognition: when the under-test information contains objects unknown to the object recognition model, the object recognition model fails to detect that the under-test information contains unknown objects. Take the under-test information as an image as an example. The image contains three objects, but the object recognition model only recognizes two objects of the three objects, the remaining object is an unrecognizable object. The remaining object is an unknown object (unrecognizable object) to the object recognition model. Since the conventional object recognition model cannot understand that the under-test information contains unknown objects, the conventional object recognition model naturally will not take any action on the unknown objects.

SUMMARY OF THE INVENTION

When a conventional object recognition model recognizes an under-test information with unknown objects, the conventional object recognition model cannot understand that the under-test information contains unknown objects, so that the conventional object recognition model will not take any action on the unknown objects. In view of this, the present invention provides a comprehension method neural network for unrecognizable objects, executed by a processing unit of a detecting apparatus and comprising:

- receiving an under-test information, wherein the under-test information includes at least one object;
- receiving an under-test information, wherein the under-test information includes at least one object;
- determining at least one type of the at least one object in the under-test information by an object recognition model corresponding to a type of the under-test information to output a quantity value of recognizable objects, wherein the object recognition model is stored in a storage unit of the detecting apparatus;
- generating a total quantity value of objects by segmenting the at least one object in the under-test information, wherein the at least one object segmented from the under-test information is defined as at least one segmentation object, and a quantity of the at least one segmentation object is defined as a total quantity value of objects;
- determining whether the quantity value of the recognizable objects is equal to the total quantity value of the objects;
- when the processing unit determines that the quantity value of the recognizable objects is less than the total quantity value of the objects, the processing unit trains the object recognition model that at least one unrecognizable object is included in the under-test information.

The comprehension method of neural network for unrecognizable objects of the present invention provides a neural network mechanism for comprehending unknown objects similar to humans, so that the object recognition model understands that the under-test information contains objects that the object recognition model cannot recognize. Therefore, the object recognition model can take subsequently actions (such as learning, memorizing, etc.) on the unknown object.

DETAILED DESCRIPTION OF THE INVENTION

In order to understand the technical characteristics and practical effects of the prevent invention in detail, and accomplish them according to the content of the present invention, the detailed description is as follows with the embodiments shown in the figures.

Figure 1:
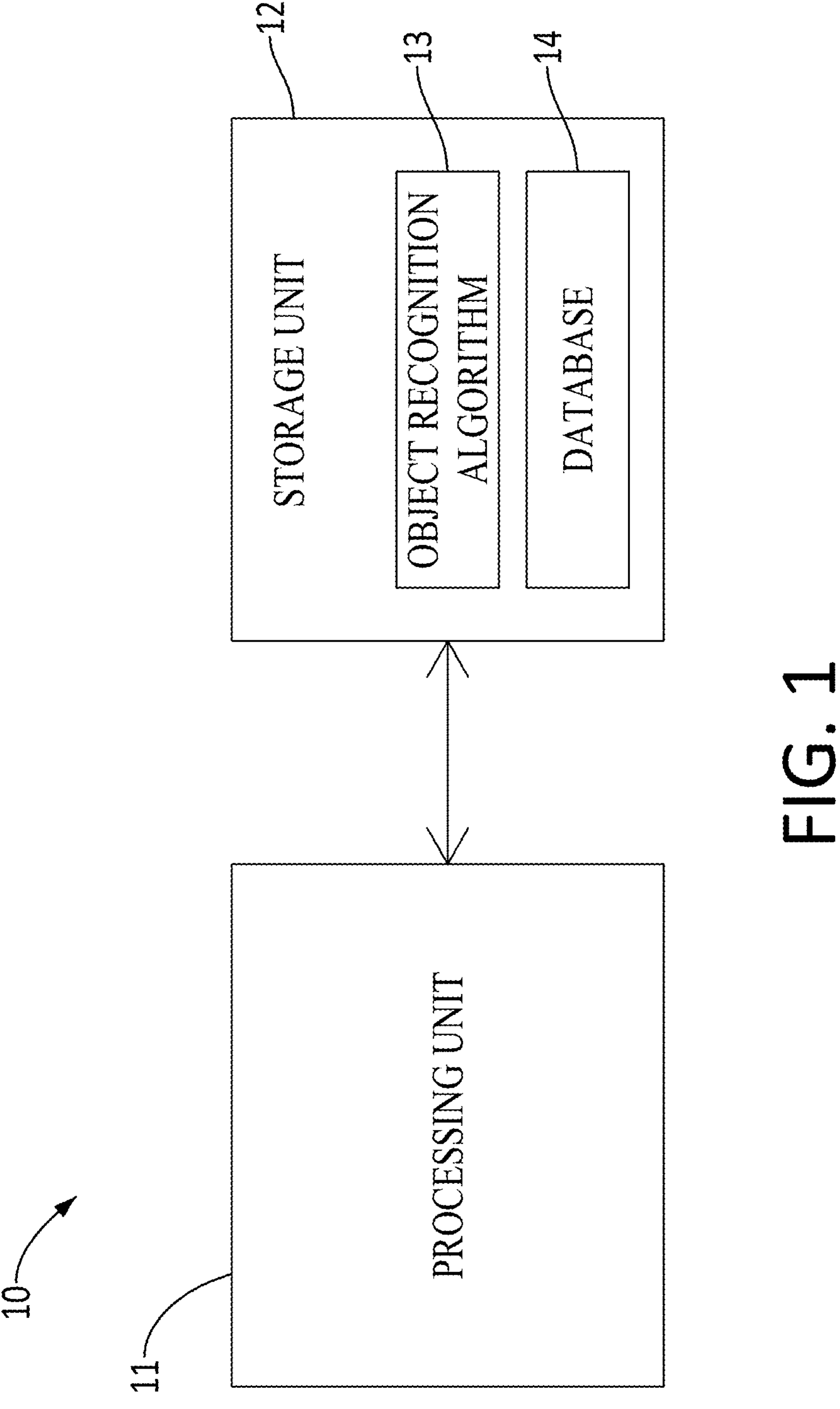
FIG. 1 is a circuit block diagram of a detecting apparatus of a comprehension method of neural network for unrecognizable objects of the present invention.

Referring to FIG. 1, a comprehension method of neural network for unrecognizable objects of the present invention is executed by a detecting apparatus 10. The detecting apparatus 10 comprises a processing unit 11 and a storage unit 12. The processing unit 11 is connected to the storage unit 12. The processing unit 11 can read data from the storage unit 12 and write data into the storage unit 12. The storage unit 12 stores a program code of an object recognition algorithm 13 and a database 14. The object recognition algorithm 13 is connected with the database 14. The processing unit 11 can read the data in the database 14 and the object recognition algorithm 13. The processing unit 11 executes the object recognition algorithm 13 according to the data in the database 14 and write executing results of the object recognition algorithm 13 into the database 14.

For example, the processing unit 11 may be a Central Processing Unit (CPU), a Graphics Processing Unit (GPU), a Digital Signal Processing (DSP), or other data processing devices. The storage unit 12 may be a hard disk, a memory, a Network Attached Storage (NAS), or other storage devices. The present invention is not limited to the foregoing examples.

Figure 2:
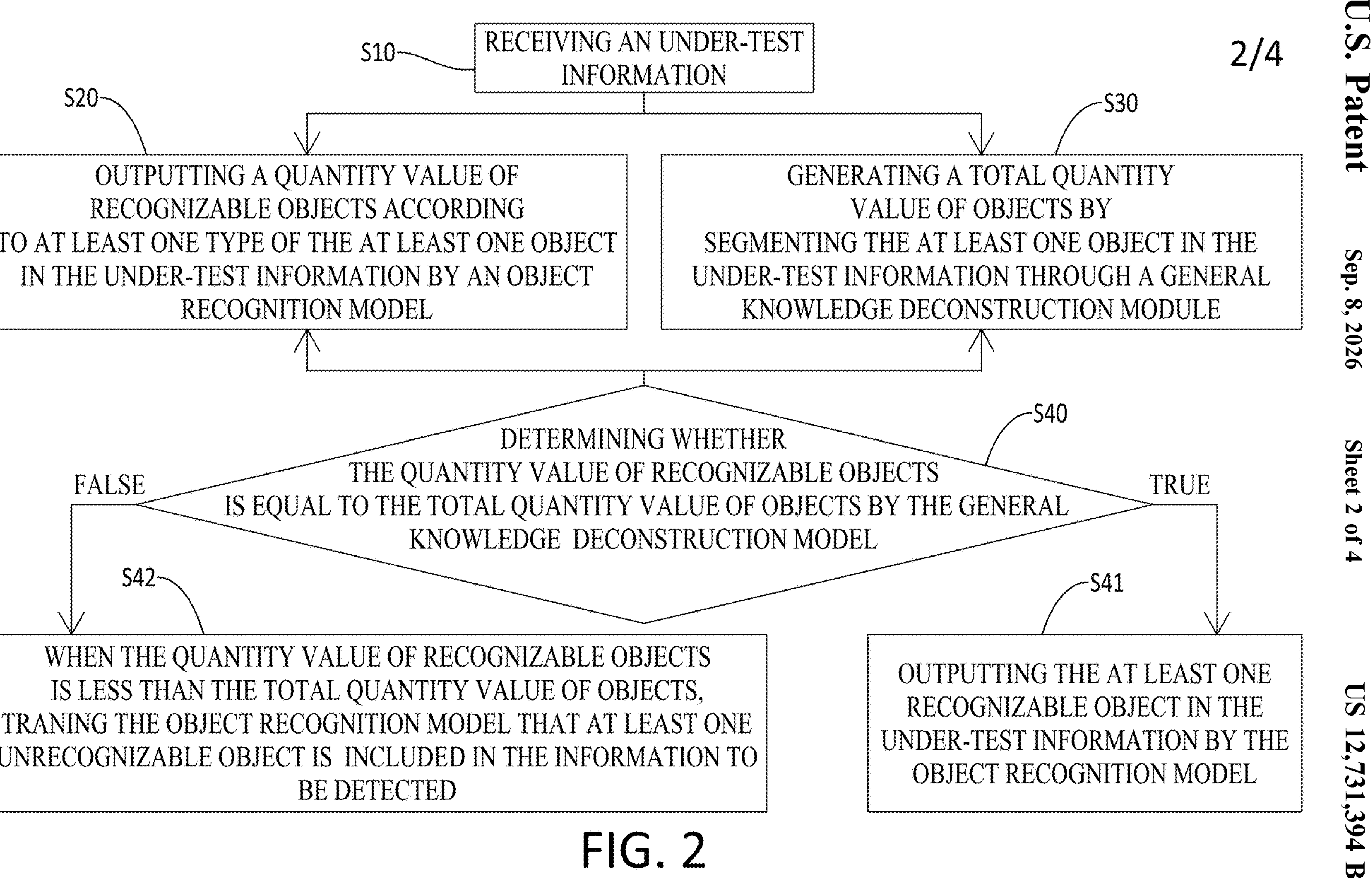
FIG. 2 is a flow chart of the comprehension method of neural network for unrecognizable objects of the present invention.
Figure 3:
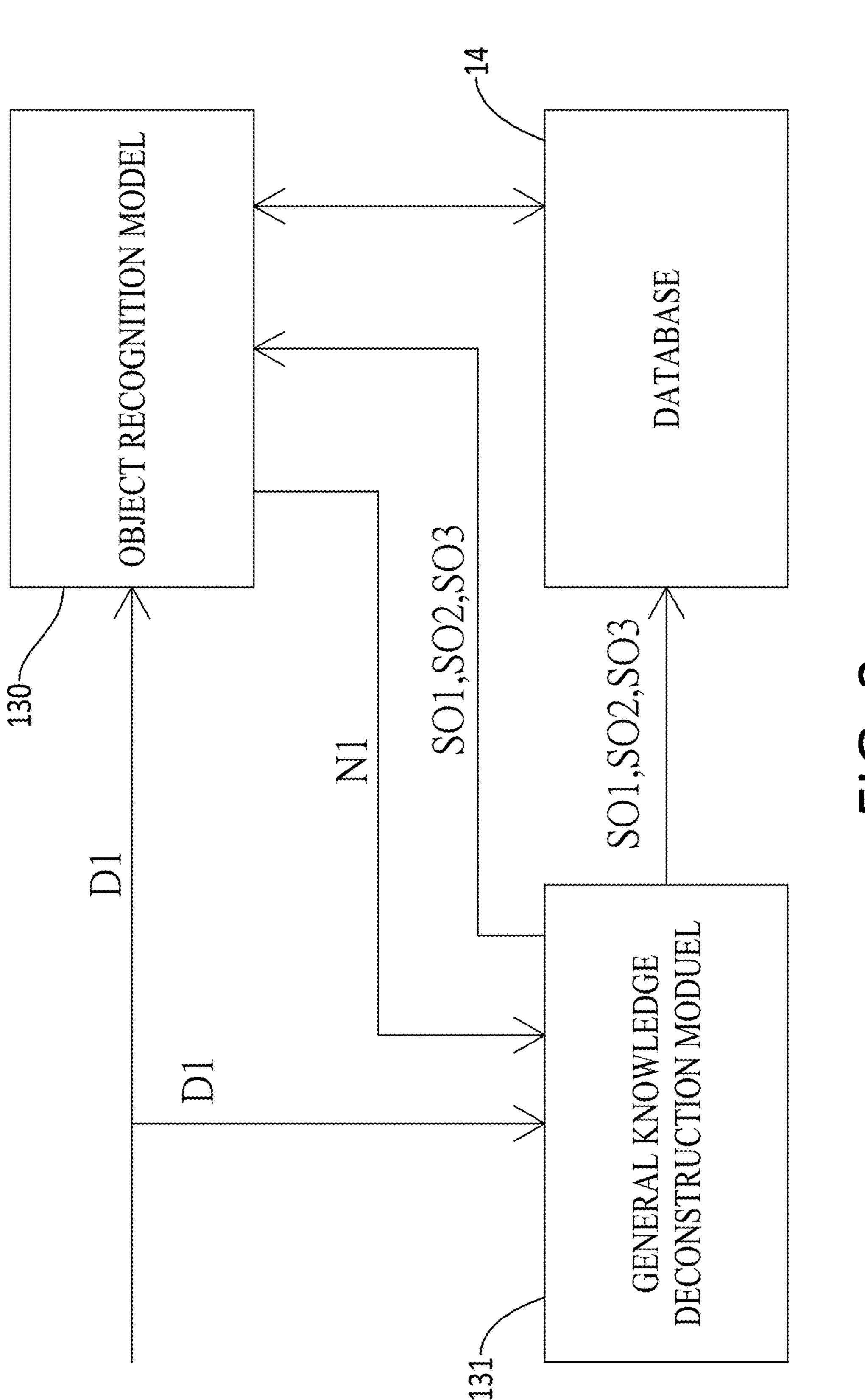
FIG. 3 is a circuit block diagram of the detecting apparatus of the comprehension method of neural network for unrecognizable objects of the present invention.

Referring to FIGS. 2 and 3, the comprehension method of neural network for unrecognizable objects comprises steps S10 to S40. Each step is described as follows.

Step S10: the step is to receive an under-test information D1, wherein the under-test information D1 contains at least one object. In particular, the processing unit 11 receives the under-test information D1. For example, the under-test information D1 is pre-stored in the storage unit 12, and the processing unit 11 reads (receives) the under-test information D1 stored in the storage unit 12 to perform subsequent object recognizing computations, or the processing unit 11 receives the under-test information D1 from an external device to the detecting apparatus 10 through an input interface.

Figure 4:
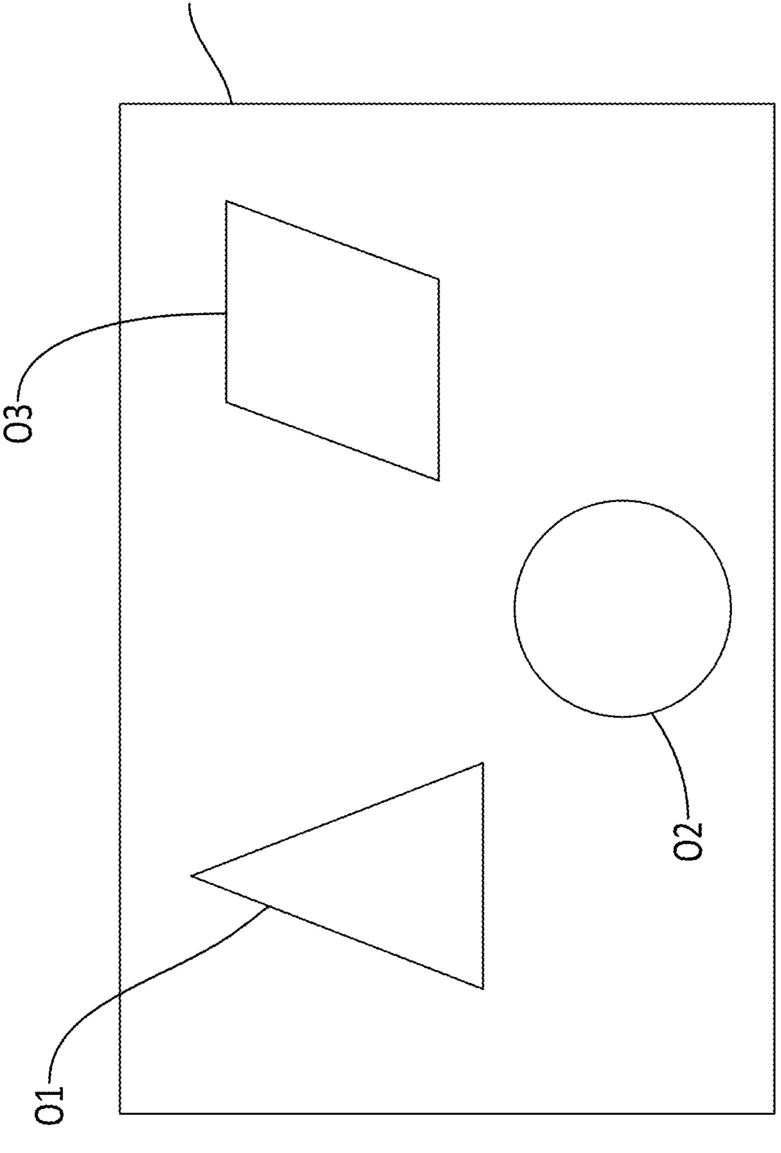
FIG. 4 is a diagram of an embodiment of an under-test information of the present invention.

The under-test information D1 can be images, texts, voice, and other information. For example, the under-test information D1 can be an under-test image I as shown in FIG. 4. The at least one object can be a graphic in the under-test image I, such as the under-test image I comprises a first object O1, a second object O2, and a third object O3. The first object O1, the second object O2, and the third object O3 have different shapes and sizes. When the under-test information is a text, and the at least one object is a word, punctuation mark, space, etc. in the text.

Step S20: the step is to determine at least one type of the at least one object in the under-test information D1 by an object recognition model 130 corresponding to a type of the under-test information D1 to output a quantity value of recognizable objects N1. In other words, the object recognition model 130 outputs the quantity value of the recognizable objects N1 according to the at least one type of the at least one object in the under-test information D1. In particular, the processing unit 11 reads and executes the object recognition algorithm 13. The object recognition algorithm 13 comprises an object recognition model 130 and a general knowledge deconstruction module 131. The object recognition model 130 is connected to the general knowledge deconstruction module 131. The processing unit 11 inputs the under-test information D1 into the object recognition model 130. The object types that the object recognition model 130 is able to recognize is same as the at least one type of the at least one object in the under-test information D1, so that the object recognition model 13 can determine whether the under-test information D1 contains at least one recognizable object. For the object recognition model 130, the recognizable objects and the unrecognizable objects belong to two different types respectively, and a quantity of the at least one recognizable object is the quantity value of the recognizable objects N1.

For example, the under-test information D1 is the under-test image I, so that the object recognition model is a neural network model used to recognize images, such as deep learning technology based on region proposals (Region-based Convolutional Neural Network (R-CNN), Region-based Fully Convolutional Neural Network (R-FCN)) or deep learning technology based on recursion (You Only Look Once (YOLO), a Single Shot Multibox Detector (SSD)). The present invention is not limited to the foregoing examples. Assume that the object recognition model 130 is able to determine that the under-test image I includes the first object O1 and the second object O2, and the first object O1 and the second object O2 are the recognizable objects to the object recognition model 130. The third object O3 in the under-test image I is an unrecognizable object to the object recognition model 130. In this example, the quantity value of the recognizable objects N1 is 2 (pieces). The object recognition model 130 outputs the quantity value of the recognizable objects N1 to the general knowledge deconstruction module 131 for subsequent comparison steps.

Step S30: the step is to generate a total quantity value of objects by segmenting the at least one object in the under-test information D1 through the general knowledge deconstruction module 131, wherein the at least one object segmented from the under-test information D1 by the general knowledge deconstruction module 131 is defined as at least one segmentation object, and a quantity of the at least one segmentation object is defined as a total quantity value of objects. Specifically, the general knowledge deconstruction module 131 is connected with the database 14 of the storage unit 12. The general knowledge deconstruction module 131 can segment each object in the under-test information D1 through the information in the database 14. An operating way of the general knowledge deconstruction module 13 is a common knowledge in the neural network technology. In short, for example, the under-test information D1 is the under-test image I as aforementioned, and the general knowledge deconstruction module 131 can execute a semantic segmentation process to generate at least one object mask. The semantic segmentation process generates the at least one object mask based on features such as texture, color, edge contour, and size in the under-test image I. The semantic segmentation process segments multiple pixels in the under-test image I through the at least one object mask to form at least one pixel set. The at least one pixel set is defined as the at least one segmentation object, which means each pixel set within the range of the object mask is the segmentation object. In an embodiment of the present invention, the semantic segmentation process is a Segment Anything Model (SAM), a Hybrid Gene Algorithm (HGA) model, and a Mask Region-Based Convolutional Neural Networks (R-CNN) model, but the present invention is not limited to the foregoing examples. As the example aforementioned, the under-test image I includes the first object O1, the second object O2, and the third object O1. The first object O1, the second object O2 and the third object O3 as shown in FIG. 3 are respectively segmented into a first segmentation object SO1, a second segmentation object SO2 and a third segmentation object SO3, and the total quantity value of the objects is 3 (pieces).

Step S40: the general knowledge deconstruction module 131 determines whether the quantity value of the recognizable objects N1 is equal to the total quantity value of the objects. The general knowledge deconstruction module 131 compares the quantity value of the recognizable objects N1 generated by the object recognition model 130 with the total quantity value of the objects.

Step S41: when the processing unit 11 determines that the quantity value of the recognizable objects N1 is equal to the total quantity value of the objects, the quantity value of the recognizable objects N1 is equal to the total quantity value of the objects, which means that the unrecognizable object does not exist in the under-test information D1 (for the object recognition model 130). The object recognition model 130 outputs the at least one recognizable object in the under-test information D1 as a detection result. The detection result output by the object recognition model 130 is the information related to the at least one recognizable object. For example, the first object O1 is a triangle as shown in FIG. 4, so that the object recognition model 130 outputs the information about "the shape of the first object O1 is triangle".

Step S42: when the quantity value of the recognizable objects N1 is less than the total quantity value of the objects, the quantity value of the recognizable objects N1 is less than the total quantity value of the objects, which means that the unrecognizable object exists in the under-test information D1 (for the object recognition model 130). The processing unit 11 trains the object recognition model that at least one unrecognizable object is included in the under-test information D1. As mentioned above, the quantity value of the recognizable objects N1 is 2 and the total quantity value of the objects is 3 (the quantity value of the recognizable objects N1 is less than the total quantity value of the objects). In an embodiment of the present invention, referring to FIG. 3, when the quantity value of the recognizable objects N1 is less than the total value quantity of the objects, the general knowledge deconstruction module 131 stores the at least one segmentation object into the database 14 respectively and defines the at least one segmentation object includes at least one unrecognizable object, so that the database 14 stores the at least one unrecognizable object. For example, the third object O3 is the unrecognizable object to the object recognition model 130. The under-test information D1 segmented through the general knowledge deconstruction module 131, the third segmentation object SO3 is still the unrecognizable object. The first segmentation object SO1, the second segmentation object SO2 and the third segmentation object SO3 are stored into the database 14, so that the database 14 stores the unrecognizable object (the third segmentation object SO3).

The database 14 has a classification module that can classify the unrecognizable objects based on their similarity, so that multiple unrecognizable groups are stored in the database 14. Each of the multiple unrecognizable groups is set with a quantitative threshold. The method of the present invention can be executed repeatedly to determine multiple different under-test information D1. When the number of the unrecognizable objects stored in one of the multiple unrecognizable groups is greater than the quantitative threshold, the database 14 defines the unrecognizable group as a new object group and inputs the new object group to the object recognition model 130, so that the object recognition model 130 subsequently is able to recognize objects of the same type as the new object group.

Furthermore, when the quantity value of the recognizable objects N1 is less than the total quantity value of the objects, the general knowledge deconstruction module 131 respectively inputs the at least one segmentation object into the object recognition model 130 again. The object recognition model 130 respectively detects whether the at least one segmentation object is a recognizable object and stores at least one detecting result into the database 14. Since each segmentation object is separated from other information in the under-test information D1, the object recognition model 130 can determine whether the at least one object in the under-test information D1 is a recognizable object to achieve a re-confirmation effect. For example, referring to FIG. 4, assume that color of an area outside the objects (the first object O1, the second object O2 and the third object O3) in the under-test information D1 is dark blue, and color of the third object O3 also is dark blue. In step S20, the object recognition model 130 may not be able to recognize the third object O3. However, the object recognition model 130 can recognize the third segmentation object SO3 (the third object O3) after the under-test information is segmented in the step S30.

The result of detecting the at least one segmentation object by the object recognition model 130 will be stored in the database 14, so that the database 14 adjusts the objects stored in each of the aforementioned unrecognizable groups. For example, the third segmentation object SO3 is originally stored in one of the multiple unrecognizable groups. When the database 14 is stored with the result of detecting the at least one segmentation object by the object recognition model 130, the third segmentation object will be removed from the unrecognizable group.

The comprehension method of neural network for unrecognizable objects of the present invention determines at least one type of at least one object in an under-test information D1 by an object recognition model 130 to output a quantity value of recognizable objects N1, generates a total quantity value of objects by segmenting the at least one object in the under-test information D1 that is segmented through a general knowledge deconstruction module 131, and compares whether the quantity vale of the recognizable objects N1 is equal to the total quantity value of the objects through the general knowledge deconstruction module 131. When the quantity value of the recognizable objects N1 is less than the total quantity value of the objects, the quantity value of recognizable objects N1 is less than the total quantity value of objects, which means the under-test information D1 contains object (unknown objects) that are not recognized by the object recognition model 130. The processing unit 11 trains the object recognition model 130 that at least one unrecognizable object is included in the under-test information D1. The present invention provides a neural network mechanism for comprehending unknown objects similar to humans, so that the object recognition model 130 understands that the under-test information D1 contains objects that the object recognition model 130 cannot recognize. Therefore, the object recognition model 130 can take subsequent actions on the unknown object; for example, the object recognition model 130 uses the unrecognizable object as training data to improve a recognition capability of the object recognition model 130.

The above only records the implementations or embodiments of the technical artifices adopted by the present invention to solve the problems, and is not configured to limit the claims of the present invention. That is, all equivalent changes and modifications that are consistent with the meaning of the claims of the present invention or made in accordance with the claims of the present invention are covered by the claims of the present invention.

What is claimed is:

1. A comprehension method of neural network for unrecognizable objects, executed by a processing unit of a detecting apparatus and comprising:

receiving an under-test information, wherein the under-test information includes at least one object;

determining at least one type of the at least one object in the under-test information by an object recognition model corresponding to a type of the under-test information to output a quantity value of recognizable objects, wherein the object recognition model is stored in a storage unit of the detecting apparatus;

generating a total quantity value of objects by segmenting the at least one object in the under-test information, wherein the at least one object segmented from the under-test information is defined as at least one segmentation object, and a quantity of the at least one segmentation object is defined as a total quantity value of objects;

determining whether the quantity value of the recognizable objects is equal to the total quantity value of the objects;

when the processing unit determines that the quantity value of the recognizable objects is less than the total quantity value of the objects, the processing unit trains the object recognition model that at least one unrecognizable object is included in the under-test information.

2. The comprehension method as claimed in claim 1, wherein when the processing unit determines that the quantity value of the recognizable objects is less than the total quantity value of the objects, the processing unit stores the at least one segmentation object into a database respectively;

wherein the at least one segmentation object includes at least one unrecognizable object, so that the database stores the at least one unrecognizable object.

3. The comprehension method as claimed in claim 1, wherein when the processing unit determines that the quantity value of the recognizable objects is less than the total quantity value of the objects, the processing unit respectively inputs the at least one segmentation object into the object recognition model; the object recognition model respectively detects whether the at least one segmentation object is a recognizable object and stores at least one detecting result into a database.

4. The comprehension method as claimed in claim 1, wherein the under-test information is an under-test image, the processing unit executes a semantic segmentation process to generate at least one object mask; the semantic segmentation process segments multiple pixels in the under-test image through the at least one object mask to form at least one pixel set; and the at least one pixel set is defined as the at least one segmentation object.

5. The comprehension method as claimed in claim 4, wherein the semantic segmentation process is selected from a group consisting of a Segment Anything Model (SAM), a Hybrid Gene Algorithm (HGA) model, and a Mask Region-Based Convolutional Neural Networks (R-CNN) model.

* * * * *